United States Patent

Deal, Jr.

[11] 4,275,549
[45] Jun. 30, 1981

[54] FRUIT HARVESTER

[76] Inventor: Carl P. Deal, Jr., 1906 Chieftan, Dade City, Fla. 33525

[21] Appl. No.: 133,299

[22] Filed: Mar. 24, 1980

[51] Int. Cl.³ .......................................... A01D 46/24
[52] U.S. Cl. ................................................ 56/328 R
[58] Field of Search ..................................... 56/328 R

[56] References Cited

U.S. PATENT DOCUMENTS

| | | | |
|---|---|---|---|
| 3,537,245 | 11/1970 | Smith ................................. | 56/328 R |
| 3,646,741 | 3/1972 | Edwards et al. .................. | 56/328 R |
| 3,653,195 | 4/1972 | Cochran ............................ | 56/328 R |
| 3,925,973 | 12/1975 | Glover .............................. | 56/328 R |

*Primary Examiner*—Jay N. Eskovitz
*Attorney, Agent, or Firm*—Harvey B. Jacobson

[57] ABSTRACT

A rotary fruit picking head is provided and journaled from a suitable universally positionable mount therefor. The head includes a hollow body having peripheral wall surfaces extending along circular paths concentric with the axis of rotation of the head and the wall surfaces include the peripherally spaced generally oval fruit receiving openings formed therein having their major length axes extending along the aforementioned circular paths. The opposite ends of the openings include endwise outwardly projecting and inwardly opening stem catching notches opening inwardly generally along the aforementioned paths.

8 Claims, 8 Drawing Figures

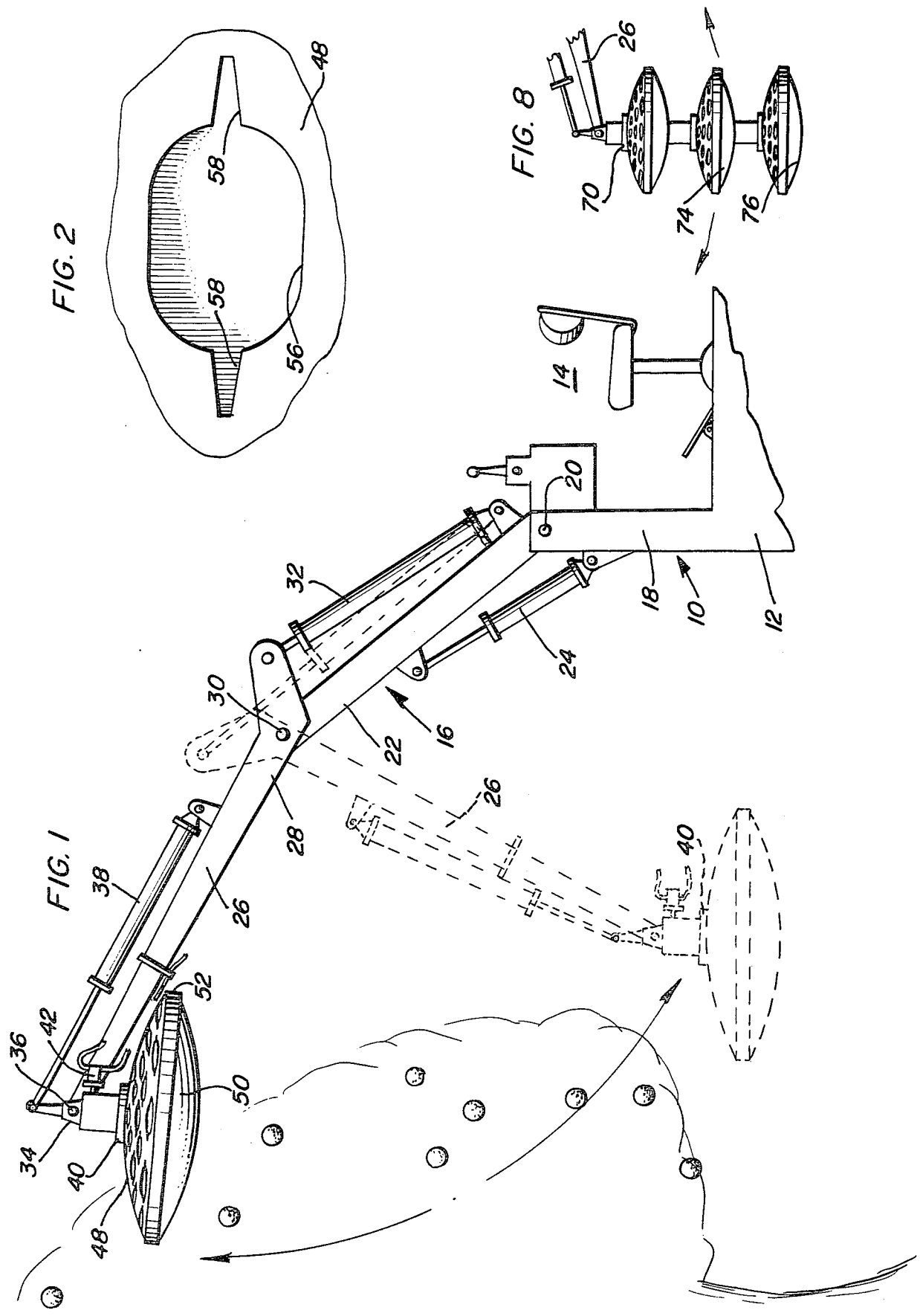

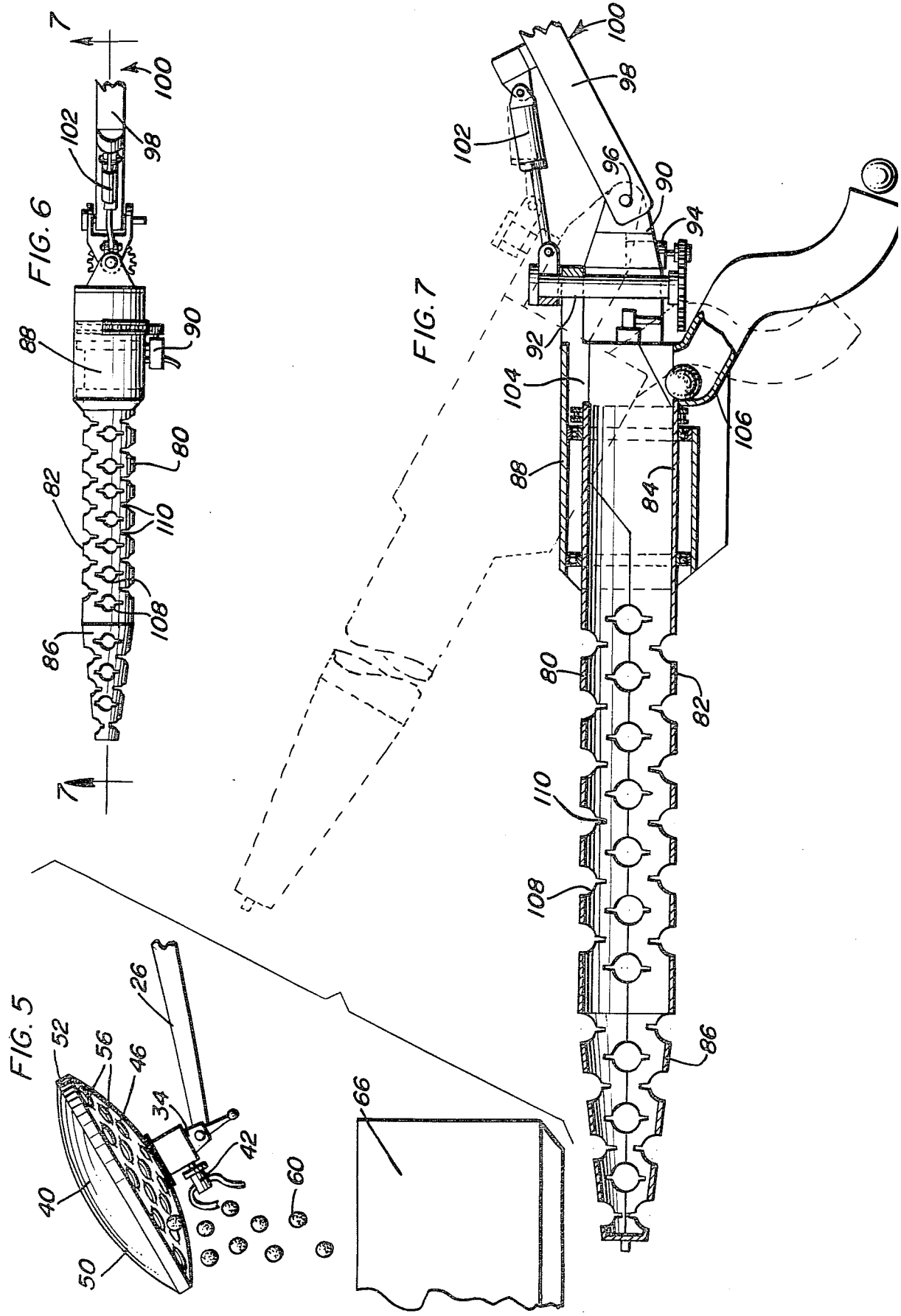

FRUIT HARVESTER

BACKGROUND OF THE INVENTION

Various forms of fruit picking equipment heretofore have been designed. Some fruit picking equipment merely includes vertically and horizontally shiftable platforms from which workmen may be supported and the platforms may be moved about a tree in order that the workmen supported therefrom may pick fruit from the tree. Other forms of fruit pickers have included vacuum snouts which may be swung into position to suck fruit from fruit trees and still other forms of fruit pickers include mechanical pickers for engaging and either pulling or stripping fruit from fruit trees. Various examples of some forms of the aforementioned mechanical fruit picking equipment including some of the general structure and operational features of the instant invention are disposed in U.S. Pat. Nos. 3,485,024, 3,517,496, 3,543,492, 3,552,107 and 3,810,351. The picking equipment which utilizes manual pickers has become prohibitive from an expense standpoint, vacuum actuated pickers are difficult to manipulate and are also expensive from a labor standpoint and most forms of the more economical mechanical pickers which engage and pull or strip fruit from fruit trees have not reached a state of development wherein damage to the fruit trees is maintained at a minimum. Accordingly, a need exists for an economical mechanical fruit picker which may be utilized to effectively pick fruit from fruit trees and which will inflict minimum damage to the fruit trees.

BRIEF DESCRIPTION OF THE INVENTION

The fruit picker or harvester of the instant invention includes a rotary head including a hollow body having peripheral wall surfaces extending along circular paths concentric with the axis of rotation of the head. The head may be rotated in opposite directions and inasmuch as its peripheral surfaces extend along circular paths concentric with the axis of rotation of the head, the head may be rotated within the branches of the trees in a manner effecting minimum damage to the branches. The peripheral wall surfaces of the body include spaced generally oval receiving openings in which fruit upon the associated tree may drop and the opposite ends of the openings include endwise outwardly projecting and inwardly opening stem catching notches opening inwardly generally along the aforementioned paths. In this manner, only the heavier fruit bearing stem portions of the tree are actually engaged in a positive manner by the rotary head and fruit upon the tree may be quickly picked therefrom with minimum damage to the tree.

The main object of this invention is to provide a fruit picker which will be capable of quickly, efficiently and economically picking fruit from fruit trees.

Another object of this invention is to provide a fruit picking apparatus capable of performing a fruit picking operation with minimum damage to the associated trees.

Still another important object of this invention is to provide a fruit picking apparatus which may be operated by a single person performing the fruit picking operation.

A final object of this invention to be specifically enumerated herein is to provide a fruit picking apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of a fruit picker constructed in accordance with the present invention and with an alternate position of the head supporting boom of the fruit picker illustrated in phantom lines;

FIG. 2 is an enlarged fragmentary plan view illustrating the shape of one of the openings in the fruit picking head;

FIG. 5 is a fragmentary side elevational view illustrating the manner in which the rotary fruit picking head may be inverted for the purpose of dumping the picked fruit therefrom;

FIG. 6 is a top plan view of a modified form of rotary fruit picking head;

FIG. 7 is an enlarged fragmentary vertical sectional view taken substantially upon the plane indicated by the section line 7—7 of FIG. 6; and FIG. 8 is a fragmentary side elevational view of a third form of rotary fruit picking head.

DETAILED DESCRIPTION OF THE INVENTION

Figure 3:
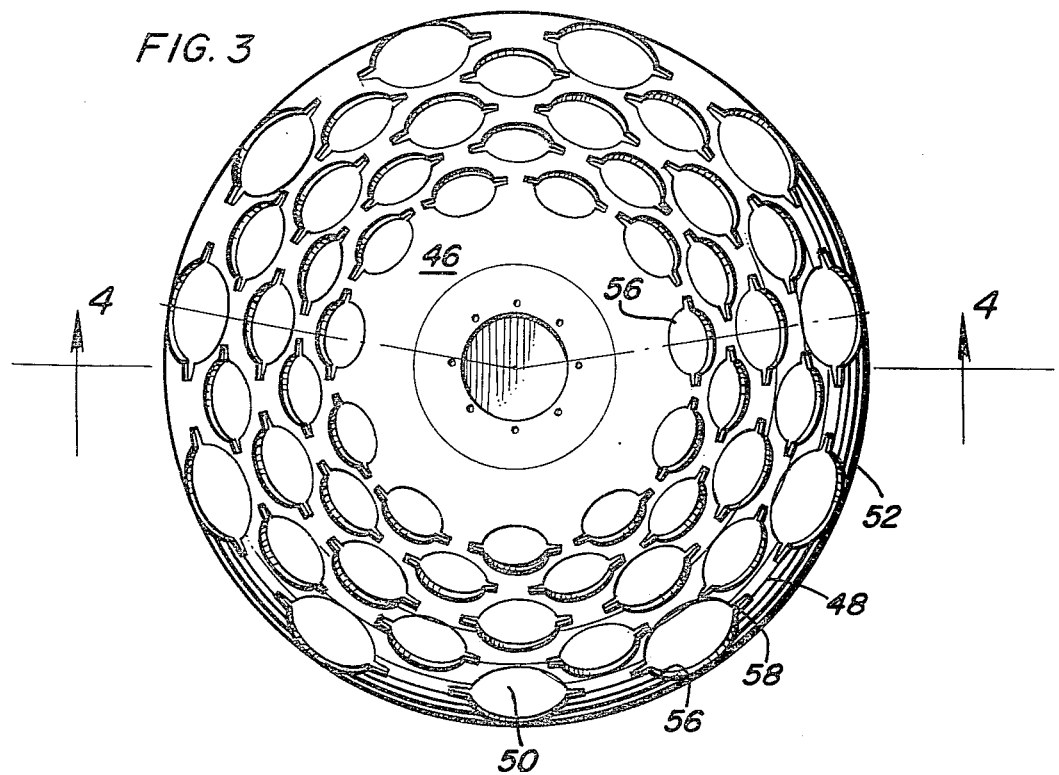
FIG. 3 is an enlarged top plan view of the rotary head portion of the fruit picker illustrated in FIG. 1.

Referring now more specifically to the drawings, the numeral 10 generally designates the fruit picker or harvester of the instant invention. The harvester 10 includes a maneuverable powered land vehicle 12 including an operator's position 14 and an articulated boom assembly referred to in general by the reference numeral 16 is pivotally supported from a rotatable portion 18 of the vehicle 12 as at 20. The rotatable portion 18 is adjustably angularly displaceable about a vertical axis relative to the remainder of the vehicle 12 somewhat in the manner in which a back hoe boom is pivotally about a vertical axis relative to the supporting vehicle. The boom assembly 16 includes a base section 22 pivotally supported from the portion 18 as at 20 and a fluid motor 24 is operatively connected between the base section 22 and the portion 18 for swinging the base section 22 in a vertical plane. The boom assembly 16 includes a second boom section 26 having a base end 28 pivotally supported from the free end of the section 22 as at 30 and a second fluid motor 32 is operatively connected between the base section 22 and the section 26 for swinging the latter relative to the base section 22 about the pivotal connection 30.

A support 34 is pivotally supported from the free end of the section 26 as at 36 and a third fluid motor 38 is operatively connected between the section 26 and the support 34 for adjustably angularly displacing the support 34 relative to the free end of the section 26. A rotary head 40 is journaled from the support 34 and a fluid motor 42 is operatively connected between the support 34 and the rotary head 40 for selectively rotating the head 40 relative to the support 34, in either direction.

Figure 4:
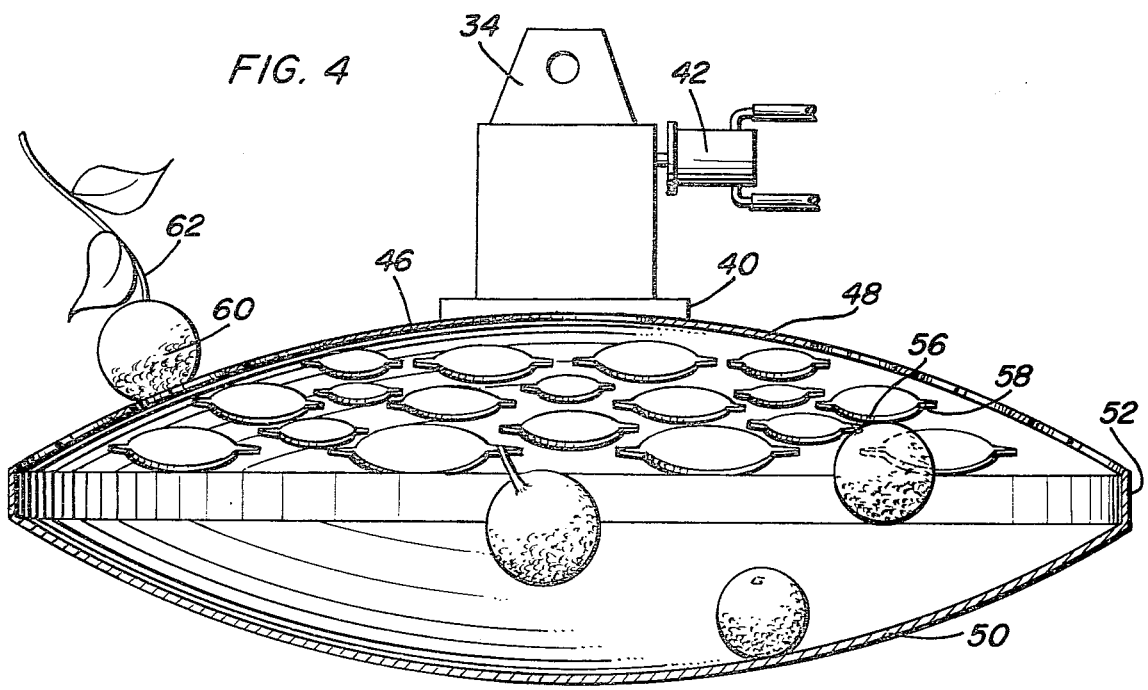
FIG. 4 is an enlarged vertical sectional view taken substantially upon the plane indicated by the sectional line 4—4 of FIG. 3.

With attention now invited more specifically to FIGS. 2, 3 and 4 of the drawings, it may be seen that the rotary head 40 includes a hollow body 46 including upper and lower walls 48 and 50. The upper wall 48 is partial spherical in configuration and opens downwardly while the lower wall 50 is also partial spherical in configuration and opens upwardly toward the upper wall 48. An intermediate cylindrical wall 52 extends and is secured between the outer peripheral portions of the upper and lower walls 48 and 50.

The upper wall 48 has a plurality of circular rows of oval openings 56 formed therein and each row of openings 56 is disposed along a circular path concentric with the axis of rotation of the head 40. The major length axes of the openings 56 are disposed along the corresponding aforementioned circular paths and each of the openings 56 includes opposite end endwise outwardly projecting and inwardly opening stem catching notches 58 which open inwardly generally along the aforementioned circular paths.

It will be noted that substantially all peripheral surface portions of the body 46 lie in circular paths concentric with the axis of rotation of the head 40 and, therefore, that the body 40 may be rotated relative to the support 34 and with the outer surfaces of the body 46 in contact with fruit tree limb portions without inflicting injury to the associated fruit tree. However, as the body 46 is rotated, in either direction, and the upper wall 48 thereof is advanced upwardly or horizontally toward fruit hanging downward from heavily laden stem portions of an associated tree, the fruit 60 will contact the upper wall 48 and be upwardly deflected by the portions of the upper wall 48 disposed between the openings 56. As soon as the fruit 60 is registered with one of the openings 56, it will fall downwardly through that opening 56 and the supportive stem portion 62 of the fruit 60 will be engaged in the trailing notch 58 of that opening 60 thereby enabling the fruit 60 to be stripped from the tree. The fruit received within the body 46 during a picking operation is retained therein until a reasonable quantity of picked fruit is supported from the lower wall 50. Then, the boom assembly 16 is swung away from the tree and toward a receptacle 66, see FIG. 5, into the fruit 60 may be discharged from the body 46 by actuation of the cylinder 38 in order to cause the head 40 to be substantially inverted in the manner illustrated in FIG. 5. As the head is swung to the inverted position illustrated in FIG. 5 and rotated by the motor 42, the picked fruit will fall back out through openings 56 and into the receptacle 66.

With attention invited more specifically to FIG. 8 of the drawings, there may be seen a modified form of head 70 which is substantially identical to the head 40, but which includes two additional bodies 74 and 76 identical to the body 46. The three bodies of the head 70 are supported from each other in vertically spaced relation and it is believed apparent that the three bodies of the head 70 may be horizontally advanced into three vertically spaced portions of a fruit tree for faster picking of the fruit therefrom.

With attention now invited more specifically to FIGS. 6 and 7 of the drawings, there may be seen a third form of fruit picking head referred to in general by the reference numeral 80. The head 80 is in the form of a cylindrical body 82 including base and free end portions 84 and 86. The free end portion 86 is slightly tapered toward its free end and the base end portion 84 is rotatably journaled from a support 88, a driving motor 90 being operatively connected between the support 88 and the head 80 for rotating the latter relative to the support 88. The support 88 is pivotally mounted from a mount 90 by a pivot pin 92 and a motor 94 is operatively connected between the mount 90 and the pivot pin 92 for effecting selected angular adjustment of the support 88 relative to the mount 90 about the pivot pin 92. Also, the mount 90 is pivotally supported, as at 96, from the free end section 98 of a boom assembly 100 similar to the boom assembly 16 and a fluid motor 102 is operatively connected between the free end section 98 and the pivot pin 92 for effecting selected angular adjustment of the mount 90 relative to the free end section 98 about the pivot connection 96.

The support 88 defines an outwardly opening socket 104 in which the base end portion 84 of the tubular body 82 is journaled and the support 88 includes an outlet spout 106 opening outwardly of the socket 104 through which picked fruit may roll from within the body 22, by gravity, to a collection point. The body 82 includes a plurality of circumferentially and axially spaced openings 108 corresponding to the openings 56 and equipped with notches 110 corresponding to the notches 58. The greater dimension axes of the openings 108 extend circumferentially about the cylindrical base end portion of the body 102 and, thus, it may be seen that the head 80 may be rotated in substantially the same manner as the head 40 in order to pick fruit from a fruit tree. The head 80, is specifically designed to reach further into the center portion of a fruit tree and it is to be noted that the head 80 will substantially always be operated in an inclined position with the free end portion 86 disposed uppermost. Further, although it is expected that fruit received within the head 80 will be retained therein against falling from the openings 108 formed in the underside thereof inasmuch as the fruit within the head 80 will be constantly rolling during rotation of the head 80, if it is desired a stationary shallow fruit receiving trough may be supported from the support 88 in underlying position relative to the under side of the head 80 in order to receive fruit which may fall through the lower openings of the head 80. Of course, the end of the trough adjacent the outlet 106 will be communicated therewith for discharging collected fruit into the outlet 106.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A rotary fruit harvester including a mount, a rotary head journaled from said mount, said head including a hollow body having peripheral wall surfaces extending along circular paths concentric with the axis of rotation of said head, said surfaces including spaced fruit receiving openings therein, said peripheral wall surfaces comprising outer surface areas of generally partial spherical wall portion of said head substantially concentric with the axis of rotation of said head.

2. The combination of claim 1 wherein said partial spherical wall portion comprises an axial end wall portion of said hollow body, said hollow body including a second partial spherical wall portion opening toward the first mentioned partial spherical axial end wall portion, means joining the outer peripheral portions of said partial spherical wall portions.

3. The combination of claim 2 wherein said mount is supported from the free end of a support boom for angular displacement relative to said boom about an axis disposed at substantially right angles relative to the axis of rotation of said head relative to said mount.

4. The combination of claim 1 wherein said rotary head includes at least one additional hollow body spaced axially along the axis of rotation of the first mentioned hollow body relative to the latter, said additional hollow body also including peripheral surfaces extending along circular paths generally concentric with the axis of rotation of said head and including peripherally spaced general oval fruit receiving openings formed therein having their major length axes extending along said paths, the fruit receiving openings of said additional hollow body also including opposite end endwise outwardly projecting and inwardly opening stem catching notches opening inwardly generally along said paths.

5. The combination of claim 4 wherein said head includes three axially spaced hollow bodies.

6. The combination of claim 1 wherein said mount is supported from the free end of a support boom for angular displacement relative to said boom about an axis disposed at substantially right angles relative to the axis of rotation of said head relative to said mount.

7. A rotary fruit harvester including a mount, a rotary head journaled from said mount, said head including a hollow body having peripheral wall surfaces extending along circuit paths concentric with the axis of rotation of said head, said surfaces including peripherically spaced generally oval fruit receiving openings formed therein having their major length axes extending along said paths, the opposite ends of said openings including endwise outwardly projecting and inwardly opening stem catching notches opening inwardly generally along said paths, said peripheral wall surfaces being defined by a partial spherical upper wall of said body, said partial upper spherical wall of said body being outwardly convex, the outer periphery of said partial spherical upper wall including a depending partial cylindrical side wall, said body also including a partial spherical lower wall opening toward said partial spherical upper wall and having its outer peripheral portions supported from the lower marginal edges of said depending partial cylindrical side wall.

8. The combination of claim 7 wherein said mount is supported from the free end of a boom structure for annular displacement about a horizontal axis extending transversely of said boom structure and the axis of rotation of said head and is swingable relative to said boom structure between a position with the convex side of said partial spherical upper wall facing upwardly and an inverted position with the convex side of said upper wall facing downwardly.

* * * * *